United States Patent
Kawai

(10) Patent No.: US 6,721,084 B2
(45) Date of Patent: Apr. 13, 2004

(54) ELECTROPHORETIC DEVICE, METHOD FOR MANUFACTURING ELECTROPHORETIC DEVICE, AND ELECTRONIC APPARATUS

(75) Inventor: Hideyuki Kawai, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 10/224,531

(22) Filed: Aug. 19, 2002

(65) Prior Publication Data

US 2003/0063369 A1 Apr. 3, 2003

(30) Foreign Application Priority Data

Aug. 23, 2001 (JP) ........................ 2001-253480
Aug. 13, 2002 (JP) ........................ 2002-235886

(51) Int. Cl.$^7$ .......................... G02B 26/00; G09G 3/34
(52) U.S. Cl. .......................... 359/296; 345/107; 345/84
(58) Field of Search .......................... 359/296; 345/84, 345/107, 48

(56) References Cited

U.S. PATENT DOCUMENTS 5,961,804 A * 10/1999 Jacobson et al. ............ 359/296
6,392,786 B1 * 5/2002 Albert ........................ 359/296
6,473,072 B1 * 10/2002 Comiskey et al. .......... 345/107
6,549,327 B2 * 4/2003 Foucher et al. ............. 359/296
2002/0196526 A1 * 12/2002 Kawai et al. ................ 359/296
2003/0058521 A1 * 3/2003 Kawai ........................ 359/296

FOREIGN PATENT DOCUMENTS

JP 02-146019 6/1990
JP 2000-035598 2/2000

* cited by examiner

Primary Examiner—Evelyn A. Lester
(74) Attorney, Agent, or Firm—Harness, Dickey & Pierce, P.L.C.

(57) ABSTRACT

An electrophoretic device 20 of the present invention has an electrode 3 formed on a first substrate 1, a transparent electrode 4 formed on a second substrate 2, and microcapsules 40 accommodated between these electrodes 3 and 4, in which the microcapsules 40 enclose an electrophoretic dispersion 10 which contains a liquid-phase dispersion medium 6 and electrophoretic particles 5. In this electrophoretic device 20, wall films of the microcapsules at a viewing side are colored by a printing technique.

22 Claims, 10 Drawing Sheets

[FIG. 1]
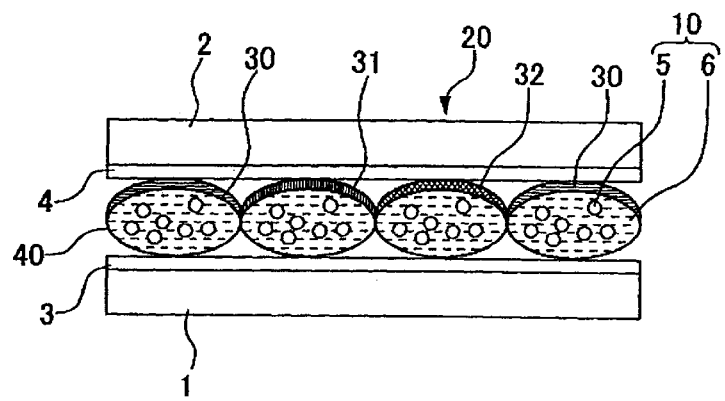
[FIG. 2]
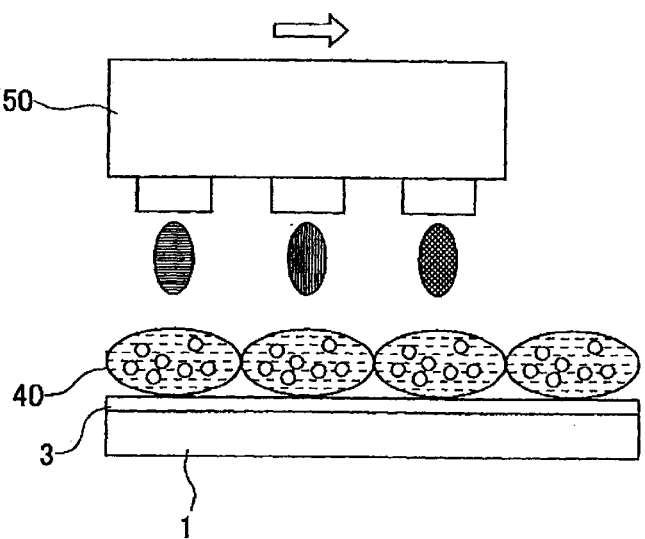

[FIG. 3]
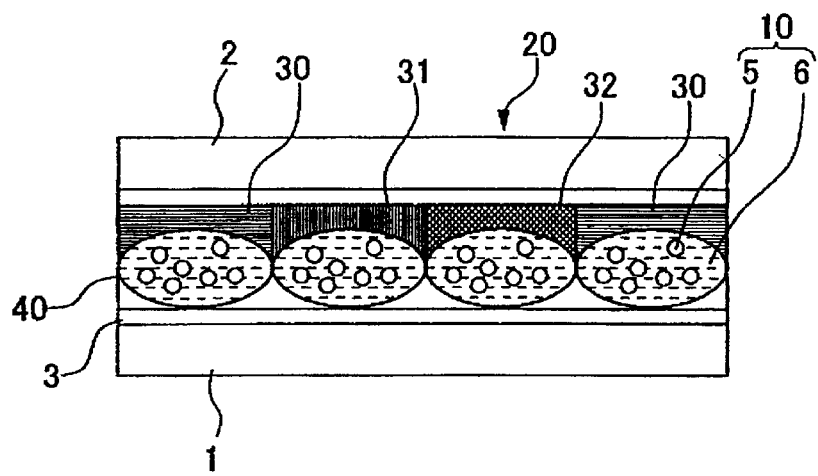
[FIG. 4]
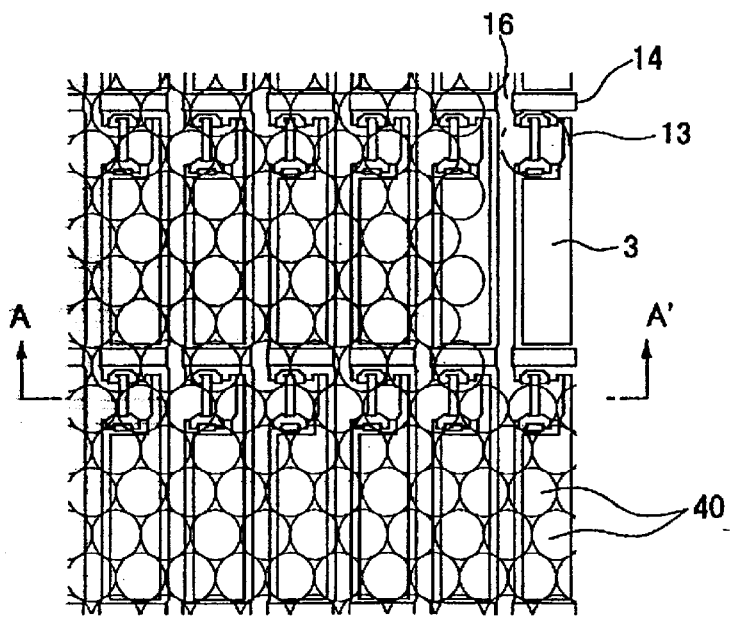

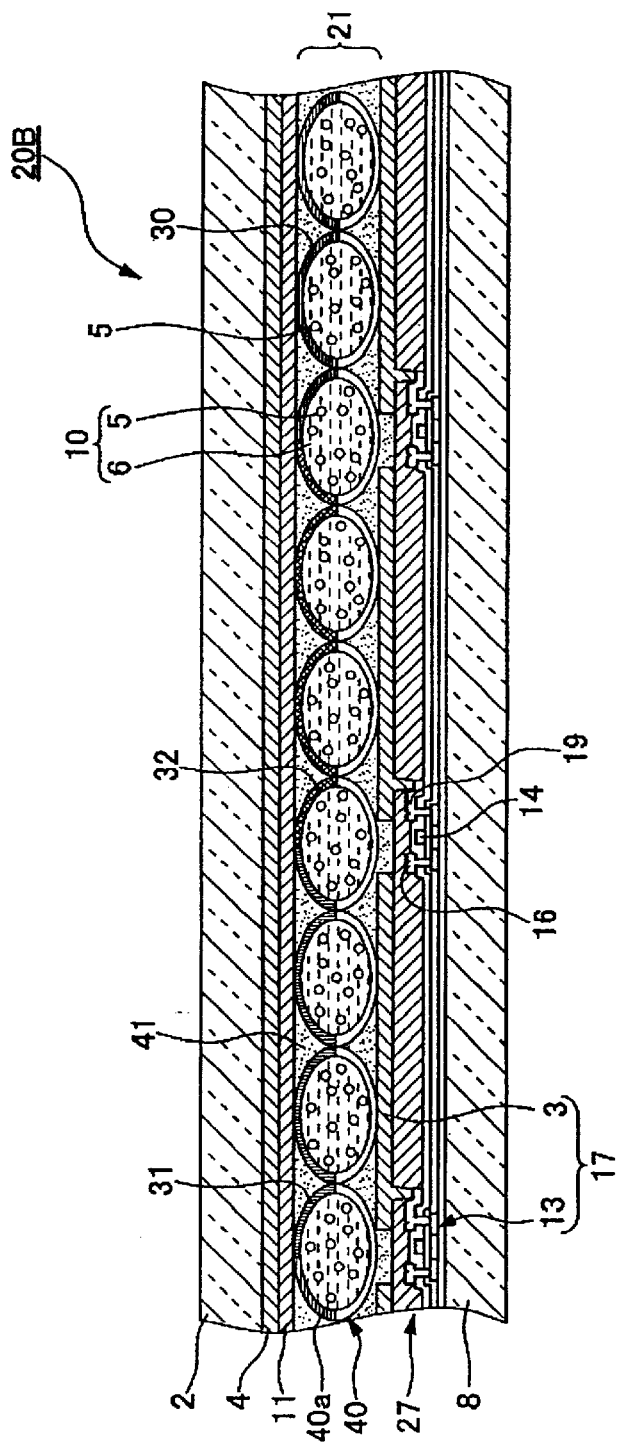
[FIG. 5]

[FIG. 6]
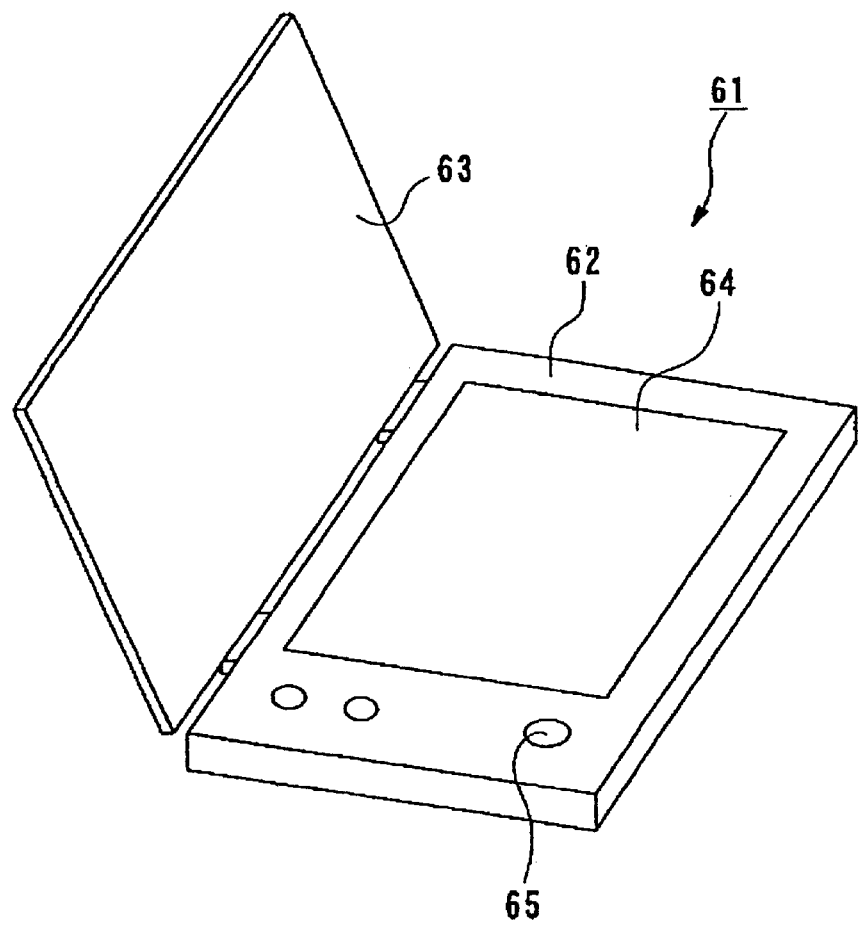

[FIG. 7]
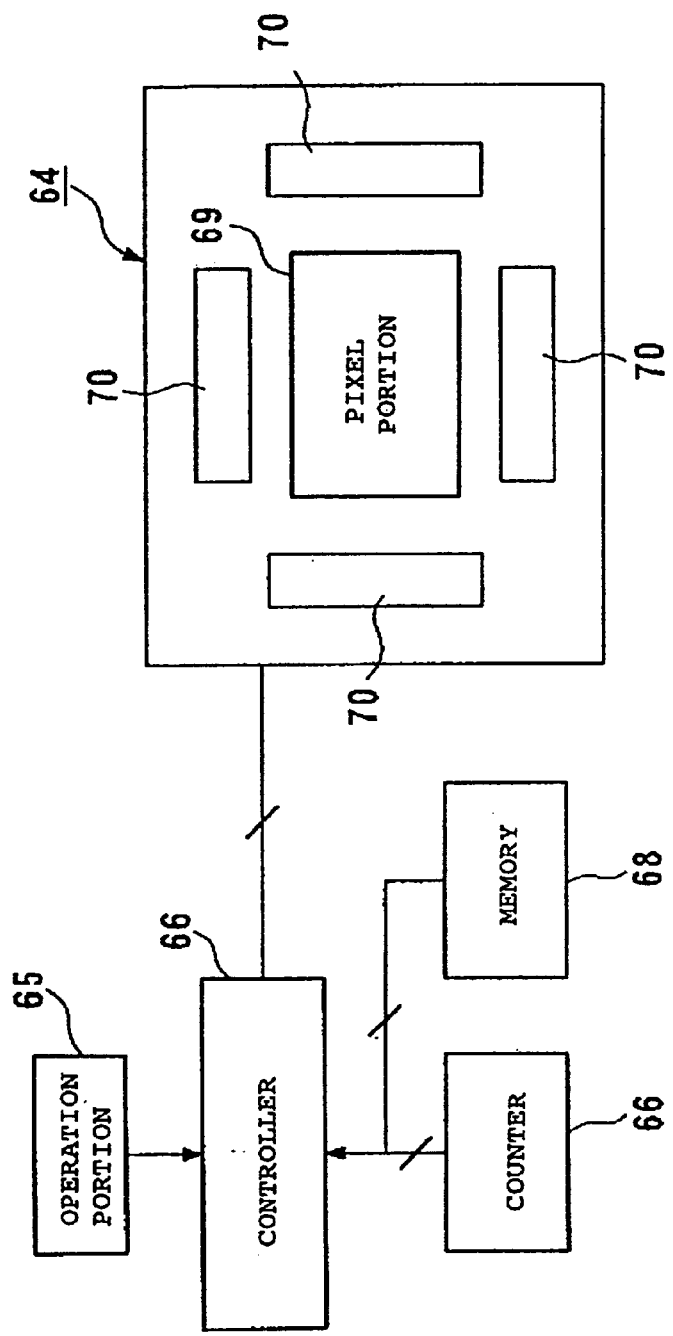

[FIG. 8]
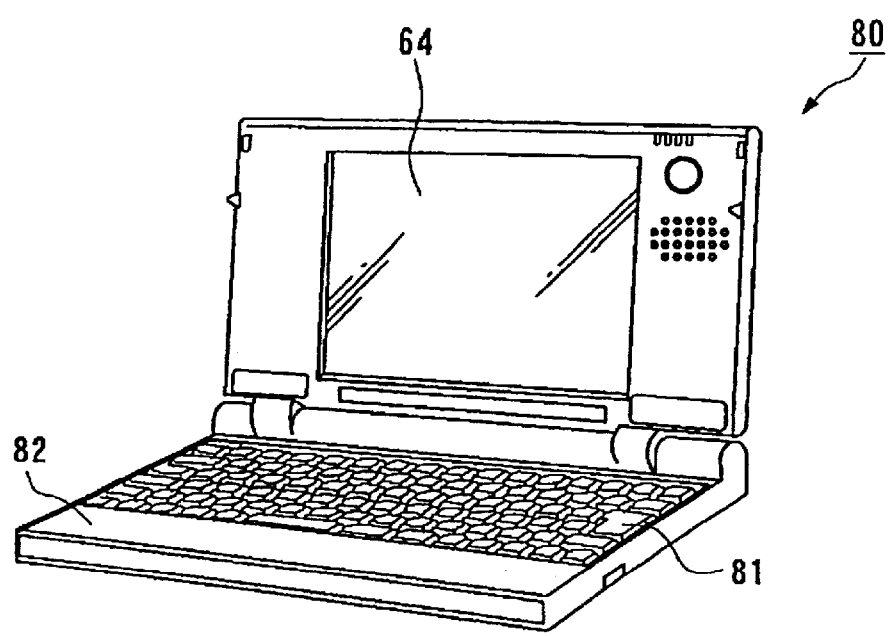

[FIG. 9]
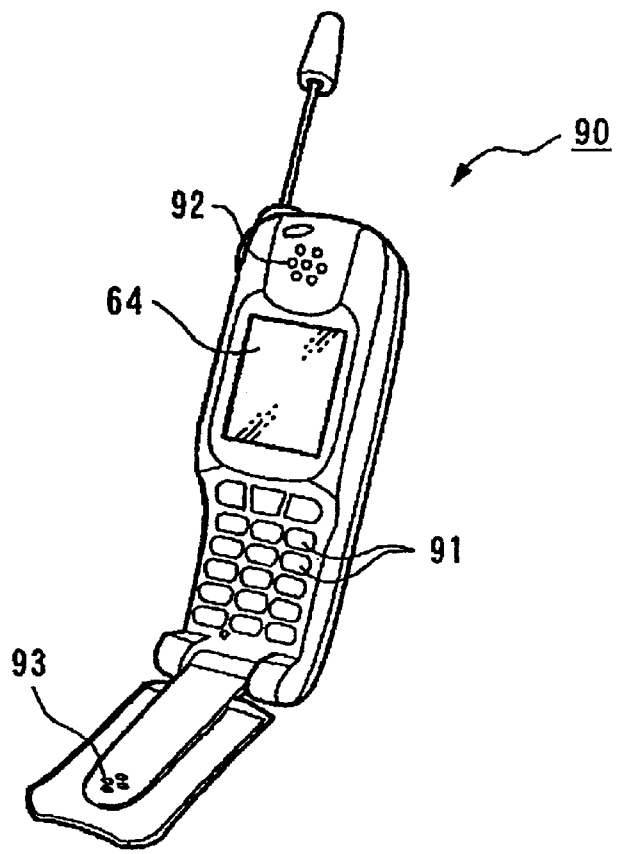

[FIG. 10]
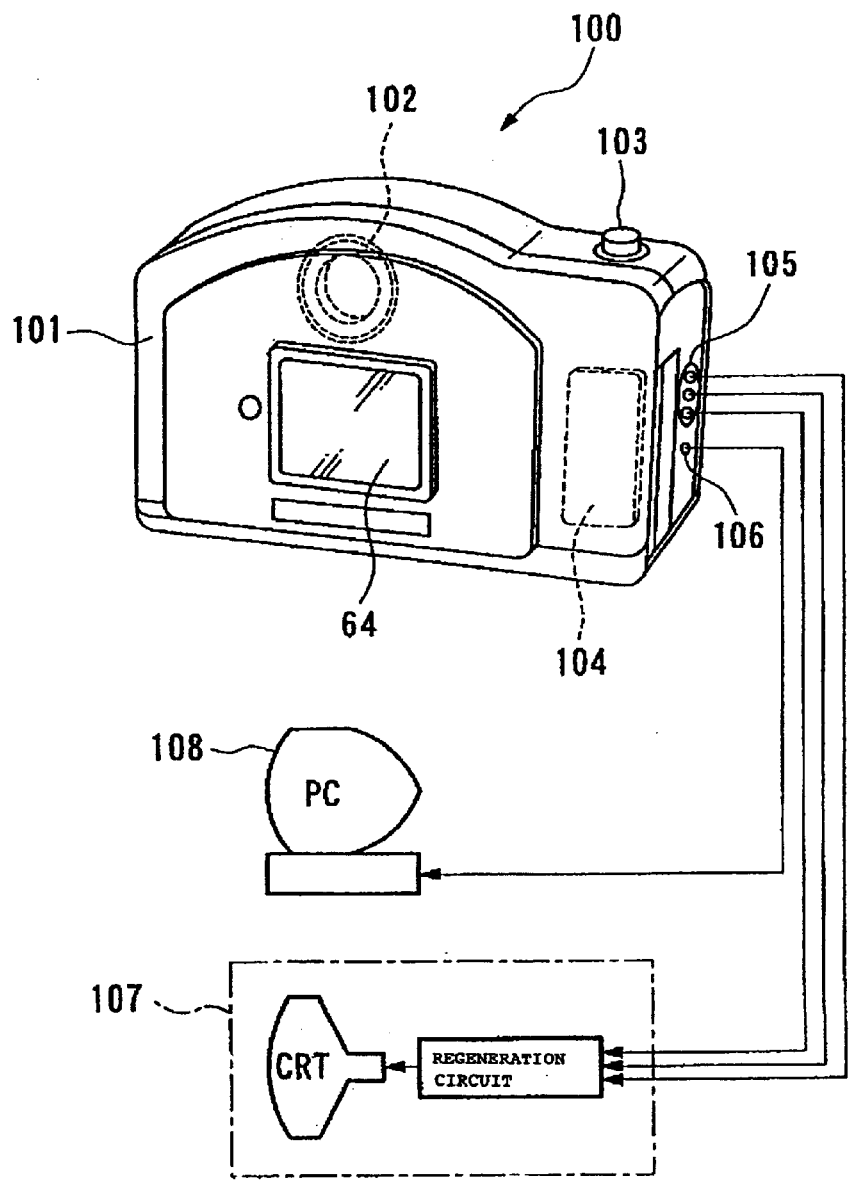

[FIG. 11]
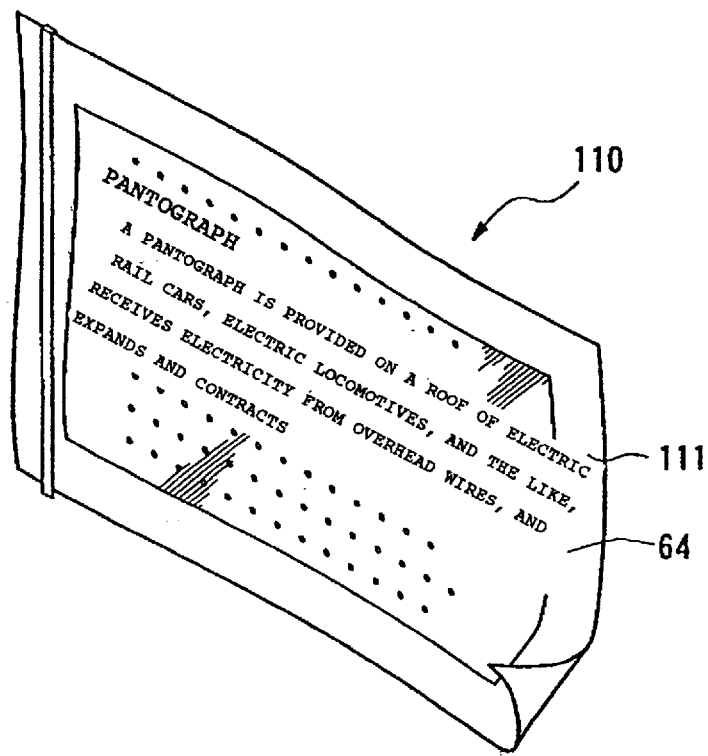
[FIG. 12]
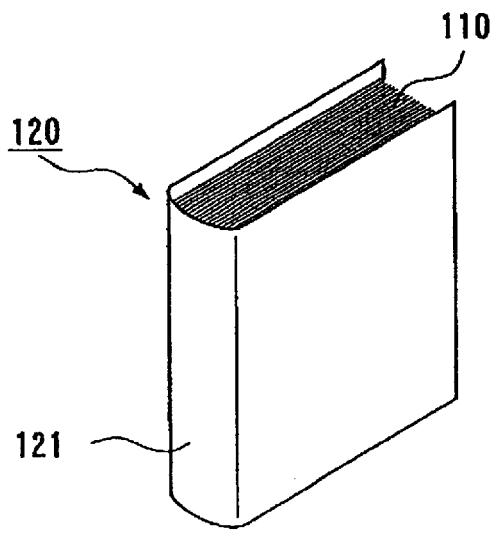

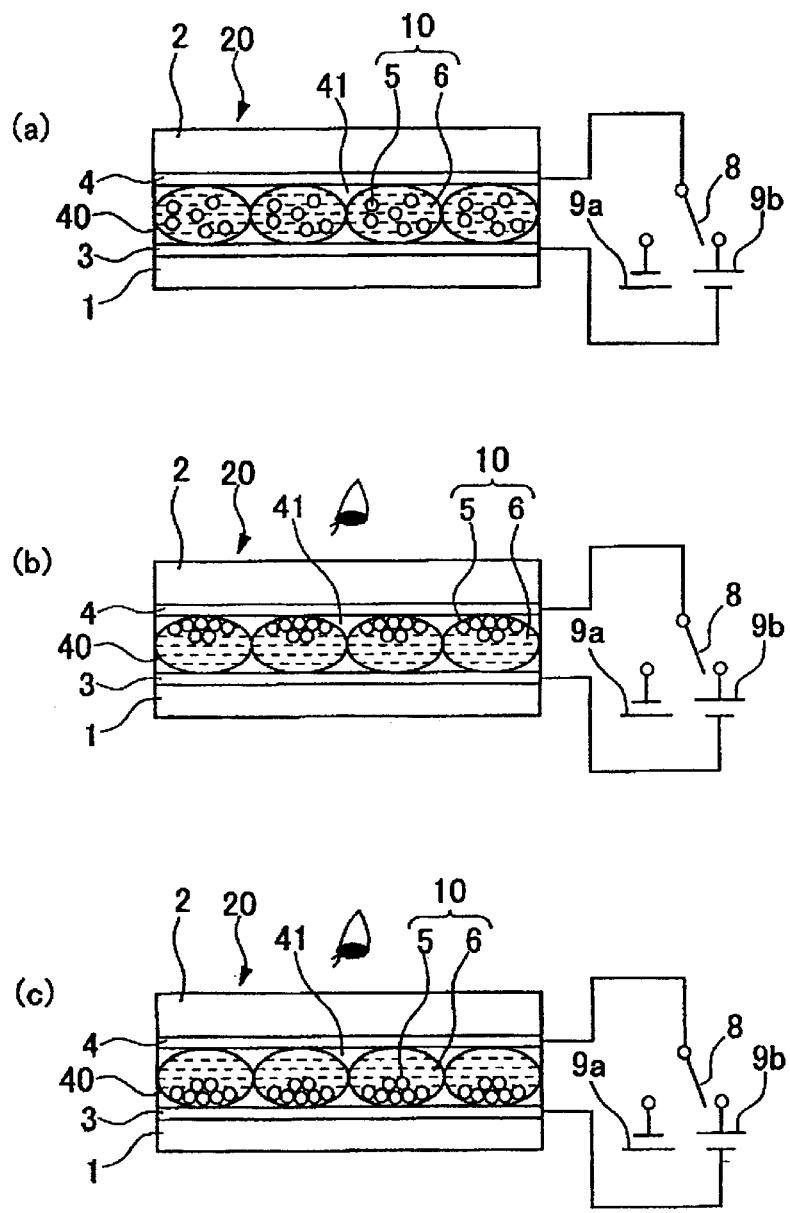
[FIG. 13]

ELECTROPHORETIC DEVICE, METHOD FOR MANUFACTURING ELECTROPHORETIC DEVICE, AND ELECTRONIC APPARATUS

BACKGROUND OF THE INVENTION

1. Technical Field of the Invention

The present invention relates to electrophoretic devices, and more particularly, relates to an electrophoretic device comprising microcapsules which enclose a liquid-phase dispersion medium and electrophoretic particles and which are provided between a pair of substrates, at least one of which is formed of a transparent material, and to a manufacturing method therefor.

In addition, the present invention relates to various electronic apparatuses each provided with an electrophoretic display device incorporating the above electrophoretic device.

2. Description of the Related Art

Hitherto, concerning electrophoretic devices comprising an electrophoretic dispersion which contains a liquid-phase dispersion medium and electrophoretic particles and which is accommodated between a pair of substrates, an application of these devices to electrophoretic display devices has been known in which change in distribution of the electrophoretic particles caused by a voltage impressed to the electrophoretic dispersion is used.

In addition, among the electrophoretic display devices as described above, an electrophoretic display device has been known in which an electrophoretic dispersion is enclosed in microcapsules, and these microcapsules are accommodated between a pair of substrates. Hereinafter, the electrophoretic display device having the structure as described above is referred to as a microcapsule type electrophoretic display device.

FIG. 13(a) is a view showing the general structure of a microcapsule type electrophoretic display device. This electrophoretic display device 20 comprises an electrode 3 formed on a first substrate 1, and a transparent electrode 4 formed of a second electrode 2. Between these electrode 3 and transparent electrode 4, microcapsules 40 are accommodated together with a binder 41, whenever necessary. This figure is regarded as a cross-section of one pixel of the display device.

In each microcapsule 40, an electrophoretic dispersion 10 is enclosed which contains a liquid-phase dispersion medium 6 and electrophoretic particles 5 dispersed in this liquid-phase dispersion medium 6. In addition, it is assumed that the liquid-phase dispersion medium 6 and the electrophoretic particles 5 are colored in different colors from each other.

To this electrophoretic display device 20, voltage sources 9a and 9b, which apply voltages in the direction opposite to each other, are connected via a switch 8. That is, the electrode 3 is connected to one end of each of the voltage sources 9a and 9b, and the electrode 4 is connected to the other end of each of the voltage sources 9a and 9b via the switch 8. When electrical connection is formed as described above, by switching the switch 8, the direction of a voltage to be applied between the electrode 3 and the electrode 4 can be changed. By changing the direction of a voltage to be applied, the electrophoretic particles can be gathered at a desired electrode side, thereby performing desired display. That is, when the electrophoretic particles 5 are positively charged, as shown in (b) of the same figure, by applying a voltage of the voltage source 9a, the electrophoretic particles 5 can be gathered at the transparent electrode 4 side which is close to an observer. In the state described above, the observer can view the color of the electrophoretic particles 5. On the other hand, as shown in (c) of the same figure, by applying a voltage of the voltage source 9b, the electrophoretic particles 5 can be gathered at the electrode 3 side which is far from the observer. In the state described above, the observer views the color of the liquid-phase dispersion 6. When the electrophoretic particles 5 are negatively charged, the moving direction of the particles is opposite to that described above.

As described above, when the structure shown in FIG. 13(a) is employed, since two types of colors each corresponding to the direction of a voltage to be applied can be displayed, an electrophoretic display device can be realized when the structure shown in the same figure is applied to every pixel, and the pixels are disposed in a matrix.

By the way, in the electrophoretic display device described above, in order to achieve improvement in fineness of displayed images and to increase information amount, color display has been desired.

As means for realizing color display, for example, a method has been proposed in which dispersing media each colored in one of predetermined three primary colors and electrophoretic particles having a color different from the three primary colors mentioned above are enclosed in microcapsules, and the three types of microcapsules thus formed which can be discriminated from each other by the colors of the dispersing media are used. However, in this method, the three types of microcapsules must be regularly and precisely arranged, resulting in a problem in that the manufacturing process becomes extremely complicated.

Alternatively, a method for realizing color display by combination of color filters has also been considered. However, when this method is applied to a microcapsule type display device, due to increase in the number of constituent elements, the cost is increased, and in addition, since color filters are disposed outside of a mixed layer of the microcapsules and the binder, a problem of parallax may arise.

Accordingly, the present invention was made in order to solve the problems of the conventional techniques described above, and a first object is to provide an electrophoretic device which can be manufactured by a simple process without increase in cost, and in which parallax will not be generated.

In addition, a second object of the present invention is to provide an electronic apparatus provided with a display device, in which even when the display device is an electrophoretic display device, parallax will not be generated.

SUMMARY OF THE INVENTION

In order to solve the problems described above and to achieve the above objects, the present invention was made as described below.

An electrophoretic device of the present invention comprises: a first substrate; a first electrode provided on the first substrate; a second substrate; a second electrode which is provided on the second substrate and which opposes the first electrode; and an electrooptic layer provided between the first electrode and the second electrode; wherein microcapsules enclosing an electrophoretic dispersion, which contains a liquid-phase dispersion medium and electrophoretic particles, are accommodated in the electrooptic layer, and wall films of the microcapsules at a viewing side are colored. According to the structure described above, since color filters are not necessary to use, the cost is not increased, and since the microcapsule wall films at the viewing side, which are in contact with the electrophoretic dispersion, are colored, the generation of parallax can be avoided. In the present invention, "the viewing side" described above means one of the major surfaces of the electrophoretic device, which is viewed by an observer, and when the electrophoretic device is used as a display device, the viewing side means a displaying surface side thereof.

An electrophoretic device of the present invention comprises: a first substrate; a first electrode provided on the first substrate; a second substrate; a second electrode which is provided on the second substrate and which opposes the first electrode; and an electrooptic layer provided between the first electrode and the second electrode; wherein a binder and microcapsules enclosing an electrophoretic dispersion, which contains a liquid-phase dispersion medium and electrophoretic particles, are accommodated in the electrooptic layer, and the binder at a viewing side is colored. According to the structure described above, the same advantages as described above can be obtained. That is, according to this structure, since color filters are not necessary to be used, the cost is not increased, and since the viewing side of the binder surrounding the peripheries of the microcapsules is colored, the generation of parallax can be avoided.

In addition, an electrophoretic device of the present invention comprises: a first substrate; a first electrode provided on the first substrate; a second substrate; a second electrode which is provided on the second substrate and which opposes the first electrode; and an electrooptic layer provided between the first electrode and the second electrode; wherein a binder and microcapsules enclosing an electrophoretic dispersion, which contains a liquid-phase dispersion medium and electrophoretic particles, are accommodated in the electrooptic layer, and at least one of the binder and wall films of the microcapsules at a viewing side is colored. According to the structure described above, the same advantages as described above can be obtained. That is, according to this structure, since color filters are not necessary to be used, the cost is not increased, and since at least one of the binder and the microcapsule wall films, which are in contact with the electrophoretic dispersion, is colored, the generation of parallax can be avoided.

The electrophoretic device of the present invention may have the structure in which the wall films of the microcapsules are colored in at least two types of colors. According to the structure described above, regardless of arrangement of the microcapsules, coloration can be performed at predetermined positions.

The electrophoretic device of the present invention may have the structure in which the binder is colored in at least two types of colors. According to the structure described above, even when the binder is unevenly distributed, regardless of the state mentioned above, coloration can be performed at predetermined positions.

The electrophoretic device of the present invention may further comprise a plurality of dot areas on a surface of the substrate, wherein the electrooptic layer may have a plurality of hues, and at least one of said plurality of hues corresponds to each of the dot areas. According to the structure described above, the electrophoretic device can be provided which exhibits a different hue in each of the dot areas.

In the electrophoretic device of the present invention, the electrooptic layer may have a plurality of hues, and said plurality of hues may correspond to three primary colors of additive mixing or subtractive mixing.

According to the structure described above, a desired hue can be displayed by combination of these three primary colors.

The electrophoretic device of the present invention may have the structure in which the wall films of the microcapsules and the binder may be colored in different colors from each other. According to the structure described above, variation of colors to be displayed can be increased.

Next, a method of the present invention for manufacturing an electrophoretic device is a method for manufacturing an electrophoretic device comprising a first substrate, a first electrode provided on the first substrate, a second substrate, a second electrode which is provided on the second substrate and which opposes the first electrode, and an electrooptic layer provided between the first electrode and the second electrode, in which the microcapsules enclosing an electrophoretic dispersion, which contains a liquid-phase dispersion medium and electrophoretic particles, are accommodated in the electrooptic layer.

The method described above comprises a step of performing coloration of wall films of the microcapsules from one surface side of the electrooptic layer in which the microcapsules are accommodated. According to the structure described above, since it is not necessary that the color filters be additionally provided for color display, the electrophoretic device can be manufactured at a reasonable cost, and in addition, since it is not necessary to consider the arrangement of the microcapsules as in the method in which coloration of the wall films and the dispersion, which constitute the microcapsules, is performed beforehand, an electrophoretic display device for color display can be significantly easily manufactured.

In a method for manufacturing an electrophoretic device, the electrophoretic device comprises a first substrate, a first electrode provided on the first substrate, a second substrate, a second electrode which is provided on the second substrate and which opposes the first electrode, and an electrooptic layer provided between the first electrode and the second electrode, wherein a binder and microcapsules enclosing an electrophoretic dispersion, which contains a liquid-phase dispersion medium and electrophoretic particles, are accommodated in the electrooptic layer.

The method described above comprises a step of performing coloration of wall films of the microcapsules and/or the binder from one surface side of the electrooptic layer in which the microcapsules and the binder are accommodated. According to the structure described above, advantages equivalent to those described above can be obtained.

In the method of the present invention for manufacturing an electrophoretic device, the wall films of the microcapsules and/or the binder may be colored by a printing method. According to the structure described above, the electrophoretic device can be formed by an easy process. The printing method mentioned above may be performed by an ink-jet method, a screen printing method, an offset method, or the like.

The method of the present invention for manufacturing an electrophoretic device may further comprise a step of moving relative positions of a head for ejecting a coloring material and the substrate, and a step of ejecting the coloring material from the head to one surface side of the electrooptic layer. According to the structure described above, since the coloring material can be precisely arranged at predetermined positions, a coloration step of performing complicated coloration can be easily carried out.

Next, an electronic apparatus of the present invention is an electronic apparatus comprising a display device for displaying data, wherein the display device described above is formed of the electrophoretic display device incorporating one of the electrophoretic device described above. According to the structure of the electronic device described above, even when the display device is an electrophoretic display device, an electronic device having a display device in which parallax is not generated can be obtained.

BRIEF DESCRIPTION OF THE DRAWINGS

FIG. 1 is a view showing the structure of an electrophoretic device according to a first embodiment of the present invention.

FIG. 2 is a view showing a method for performing coloration of microcapsule wall films of the electrophoretic device according to the first embodiment of the present invention.

FIG. 3 is a view showing an electrophoretic device according to a second embodiment of the present invention.

FIG. 4 is a plan view showing an electrophoretic device according to a third embodiment of the present invention.

FIG. 5 is a view showing the cross-sectional structure taken along the line A—A' in FIG. 4.

FIG. 6 is a perspective view showing the external structure of an electronic book as an example of an electronic apparatus of the present invention.

FIG. 7 is a block diagram showing the electrical structure of the electronic book.

FIG. 8 is a perspective view showing the external structure of a computer as an example of an electronic apparatus of the present invention.

FIG. 9 is a perspective view showing the external structure of a mobile phone as an example of an electronic apparatus of the present invention.

FIG. 10 is a perspective view showing the external structure of a digital still camera as an example of an electronic apparatus of the present invention.

FIG. 11 is a perspective view showing the external structure of electronic paper as an example of an electronic apparatus of the present invention.

FIG. 12 is a perspective view showing the external structure of an electronic notebook as an example of an electronic apparatus of the present invention.

FIG. 13 includes views showing examples of a general electrophoretic device, FIG. (a) is a view showing the structure, and FIGS. (b) and (c) show an image display principle.

DETAILED DESCRIPTION OF THE PREFERRED EMBODIMENTS

Next, with reference to drawings, embodiments of the present invention will be described. In respective drawings cited in the following description, the same reference numerals of elements in one drawing designate the same elements.
First Embodiment FIG. 1 is a view showing an electrophoretic device according to a first embodiment of the present invention. In this embodiment, for ease of illustration in the figure, an electrical power supply device is omitted in this figure. As shown in the FIG. 1, an electrophoretic device 20 of the present invention has a first substrate 1 and a second substrate 2, and between the first and the second substrates 1 and 2, microcapsules 40 enclosing an electrophoretic dispersion 10 are accommodated.

By a printing technique described later, an observation side (side viewed by an observer) of each of the microcapsule wall films is colored in the same color or at least two types of colors. In the same figure, the case is shown by way of example in which three types of colors, that is, a first hue 30, second hue 31, and third hue 32, are used.

The second substrate 2 is formed of a light transmissive plate such as a transparent glass or transparent film. On a surface of the second substrate 2 opposing the first substrate 1, a transparent electrode 4 in the form of a film is provided. The transparent electrode 4 is formed, for example, of indium tin oxide (ITO) film. As described above, since the second substrate 2 and the transparent electrode 4 are both formed of a transparent member, the second substrate 2 side is used as a viewing side of the electrophoretic device 20 according to this embodiment.

Although being not always necessary to be transparent, the first substrate 1 is formed, for example, of a glass substrate or a film substrate. In addition, on a surface of the first substrate 1 opposing the second substrate 2, an electrode 3 is formed. Although being not always necessary to be transparent, the electrode 3 is formed, for example, of an ITO film. The electrode 3 is appropriately split in order to display a desired image pattern. The electrophoretic dispersion 10 contains the liquid-phase dispersion medium 6 and the charged electrophoretic particles 5 dispersed in this dispersion medium.

As the liquid-phase dispersion media 6, there may be mentioned alcohol solvents, such as water, methanol, ethanol, isopropanol, butanol, octanol, and methyl cellusolve; various esters such as ethyl acetate and butyl acetate; ketones, such as acetone, methyl ethyl ketone, and methyl isobutyl ketone; aliphatic hydrocarbons, such as pentane, hexane, and octane; alicyclic hydrocarbons, such as cyclohexane and methylcyclohexane; aromatic hydrocarbons including benzene derivatives having a long alkyl chain, such as benzene, toluene, xylene, hexylbenzene, heptylbenzene, octylbenzene, nonylbenzene, decylbenzene, undecylbenzene, dodecylbenzene, tridecylbenzene, and tetradecylbenzene; halogenated hydrocarbons, such as methylene chloride, chloroform, carbon tetrachloride, and 1,2-dichloroethane; carboxylates; and other various fatty compounds. Together with a surfactant or the like, these mentioned above may be used alone or in combination.

In addition, the electrophoretic particle 5 is an organic or inorganic particle (polymer or colloid) having properties of being moved in a dispersion medium by electrophoresis in accordance with a potential difference. For example, there may be mentioned black pigments, such as aniline black and carbon black; white pigments, such as titanium dioxide, zinc flower, and antimony trioxide; azo-based pigments, such as monoazo, disazo, and polyazo compounds; yellow pigments, such as isoindolinone, chrome yellow, iron oxide yellow, cadmium yellow, titanium yellow, and antimony; azo-based pigments, such as monoazo, disazo, and polyazo compounds; red pigments, such as quinacridone red and chrome vermillion; blue pigments, such as phthalocyanine blue, indanthrene blue, anthraquinone-based dyes, iron blue, ultramarine blue, and cobalt blue; and green pigments such as phthalocyanine green. These mentioned above may be used alone or in combination.

Furthermore, to the pigments described above, whenever necessary, charge control agents in the form of particles composed of electrolytes, surfactants, metallic soaps, resins, rubbers, oils, varnishes, or compounds; dispersing agents, such as titanium-based coupling agents, aluminum-based coupling agents, and silane-based coupling agents; lubricants; stabilizers; and the like may be added.

As a material for forming the microcapsule wall films 40, for example, a gum arabic-gelatin-based composite film, or a compound of a urethane resin, urea resin, or urea-formaldehyde resin may be used. As a technique for forming microcapsules, a known microcapsule forming technique, such as an interfacial polymerization method, in-situ polymerization method, phase separation method, interfacial precipitation method, or spray drying method, may be used. The microcapsules preferably have the sizes approximately equivalent to each other since superior display performance thereof can be fully obtained. The microcapsules having sizes approximately equivalent to each other can be obtained, for example, by filtration or gravity concentration. The microcapsule generally has a size of approximately 30 to 100 μm.

Coloration of the microcapsule wall films may be performed, for example, by the following method. First, the microcapsules 40 formed by the method described above are applied onto the electrode 3 by a known coating method, such as a roller coating method, roller lamination method, knife coating method, screen printing method, spray method, or ink-jet method.

Next, as shown in FIG. 2, the microcapsule wall films at an observation side, that is, the sides of the films which do not oppose the first substrate, are colored by an ink-jet method using an ink-jet head 50. That is, the ink-jet head 50 is moved to a predetermined position above the first substrate 1, and ink is ejected from the ink-ejecting portions of the ink-jet head 50, thereby performing coloration of the microcapsule wall films. However, even when the microcapsule wall films are each colored at a part thereof other than that at the observation side, a problem of image quality may not arise at all.

In this step, hues and color patterns may be determined in consideration of a split pattern of the electrode 3, a desired display image, and hues of the dispersion media and electrophoretic particles. For example, in the case in which the dispersion medium is black and the electrophoretic particle is white, when coloration is sequentially performed in accordance with the split pattern of the electrode 3 by using three primary colors of additive color mixing or subtractive color mixing, full color display can be realized.

In addition, as the ink used for the coloration described above, both dye type and pigment type ink may be used.

In the above description, the ink-jet method is described by way of example; however, another known printing technique, such as screen printing or offset printing, may also be used.

When the second substrate 2 is finally laminated so that the electrode 4 is brought into contact with the microcapsules, the electrophoretic device shown in FIG. 1 is formed.

Second Embodiment

FIG. 3 is a view showing an electrophoretic device according to a second embodiment of the present invention. For ease of illustration in the figure, an electrical power source is omitted.

As shown in FIG. 3, the electrophoretic device 20 of this embodiment has the first substrate 1 and the second substrate 2, and the electrophoretic dispersion 10, which is enclosed in the microcapsules 40, is accommodated between these substrates 1 and 2 as the microcapsule layer together with a binder 41.

In this structure, the observation side of the binder 41 is colored in the same color or at least two types of colors by the printing technique described above.

In this embodiment, the microcapsule layer described above can be formed by mixing the microcapsules 40 described above and a binder resin together with a dielectric constant adjuster whenever desired, and applying this resin composition (emulsion or solution containing an organic solvent) thus formed to the substrate by a known coating method, such as a roller coating method, roller lamination method, screen printing method, spray method, or ink-jet method.

As long as having superior affinity for the microcapsules 40, adhesion to the base material, and insulating properties, the binder resin to be used is not specifically limited.

As the binder resins, for example, there may be mentioned thermoplastic resins, such as polyethylene, chlorinated polyethylene, ethylene-vinyl acetate copolymer, ethylene-ethyl acrylate copolymer, polypropylene, ABS resin, methyl methacrylate resin, vinyl chloride resin, vinyl chloride-vinyl acetate copolymer, vinyl chloride-vinylidene chloride copolymer, vinyl chloride-acrylic acid ester copolymer, vinyl chloride-methacrylic acid copolymer, vinyl chloride-acrylonitrile copolymer, ethylene-vinyl alcohol-vinyl chloride copolymer, propylene-vinyl chloride copolymer, vinylidene chloride resin, vinyl acetate resin, poly(vinyl alcohol), poly(vinyl formal), and cellulose-based resin; polymers, such as polyamide resin, polyacetal, polycarbonate, poly(ethylene terephthalate), poly(butylene terephthalate), poly(phenylene oxide), polysulfone, poly (amide imide), poly(amino bismaleimide), poly(ether sulfone), poly(phenylene sulfone), polyarylate, grafted poly (phenylene ether), poly(ether ether ketone), and poly(ether imide); fluorinated resins, such as poly(tetrafluoroethylene), poly(fluoroethylene propylene), tetrafluoroethylene-perfluoroalkoxyethylene copolymer, ethylene-tetrafluoroethylene copolymer, poly(vinylidene fluoride), poly(chlorotrifluoroethyelene), and fluorinated rubber; silicon-based resins, such as organic silicone resin and silicone rubber; and others, such as methacrylic acid-styrene copolymer, polybutylene, and methyl methacrylate-butadiene-styrene copolymer.

It is preferable that the dielectric constant of the electrophoretic display solution 10 and that of the binder 41 be approximately equivalent to each other. Accordingly, for example, alcohols, ketones, or carboxylic salts are preferably further added to the binder resin composition described above. As the alcohols mentioned above, 1,2-butanediol, 1,4-butanediol, or the like may be used.

In the above description, the case in which only the binder 41 is colored is described; however, it is apparently understood that the wall films of the microcapsules 40 and the binder 41 may both be colored.

Third Embodiment

FIGS. 4 and 5 are cross-sectional views showing the structure of a third embodiment in which the electrophoretic device of the present invention is applied to an electrophoretic display device. The electrophoretic display device in this embodiment is an example of an active matrix electrophoretic display device, and FIG. 4 is a plan view of the electrophoretic display device. In addition, FIG. 5 is a view showing the cross-sectional structure taken along the line A–A' in FIG. 4.

An electrophoretic device 20B shown in these figures comprises the first substrate 1, the second substrate 2 opposing thereto, and an electrophoretic layer (electrooptic layer) 21 provided therebetween. At the internal surface side (electrophoretic layer 21 side) of the second substrate 2, a common electrode 4 and an insulating film 11 are formed in that order. At the internal surface side (electrophoretic layer 21 side) of the first substrate 1, an element portion 27 having a plurality of pixel electrodes 3 and the like is formed. At the second substrate 2 side, the second substrate 2, the common electrode 4, and the insulating film 11 have light transmissive properties, and the external surface of the second substrate 2 serves as a display surface of the electrophoretic device 20B. Although not shown in the figure, on the first substrate 1 having the element portion 27, various peripheral circuits for driving and controlling the element portion 27 may be formed. In addition, in this embodiment, the common electrode 4 is formed at the second substrate 2 side and the element portion 27 is formed at the first substrate 1 side; however, the element portion 27 may be formed at the second substrate 2 side.

The second substrate 2 may be formed of a substrate having light transmissive properties such as a transparent glass or transparent film, and although not always necessary to be transparent, the first substrate 1 may be formed of a glass substrate or a resin film substrate.

As shown in FIG. 5, the electrophoretic layer 21 is formed by dispersing a plurality of electrophoretic particles 5 in the dispersion medium 6 accommodated in the microcapsules 40, and filling gaps between the microcapsules 40 and 40 with the binder 41. In addition, the electrophoretic particle 5 is an organic or inorganic particle (polymer or colloid) having properties of being moved in a dispersion medium by electrophoresis in accordance with a potential difference. Furthermore, to these pigments, whenever necessary, charge control agents in the form of particles composed of electrolytes, surfactants, metallic soaps, resins, rubbers, oils, varnishes, or compounds; dispersing agents, such as titanium-based coupling agents, aluminum-based coupling agents, and silane-based coupling agents; lubricants; stabilizers; and the like may be added. The combination of the dispersion medium 6 and the electrophoretic particles 5 is not specifically limited, the specific gravity of the dispersion medium 6 and that of the electrophoretic particle 5 are set approximately equivalent to each other in order to prevent the electrophoretic particles 5 from precipitating by its own weight.

FIG. 4 is a plan view showing a plurality of pixel portions 17 (pixel electrodes 3 and TFT elements 13), data lines 16, scanning lines 14, and the like, which are arranged in a matrix and which form an image display region of the electrophoretic display device 20B of this embodiment. According to the electrophoretic display device 20B of this embodiment, in each of a plurality of display units which are arranged in a matrix and which form the image display region, there are provided the pixel electrode 3 functioning as a transparent conductive layer and the TFT element 13 for controlling electricity supplied to the pixel electrode 3, and the data line 16 to which an image signal is supplied is electrically connected to the source of the TFT element 13. The image signals to be stored in the data lines 16 are supplied in a line-sequential manner thereto or are supplied to each group formed of a plurality of neighboring data lines 16.

In addition, as shown in FIG. 5, the scanning lines 14 are electrically connected to the gates of the TFT elements 13, and scanning signals are applied pulsewise in a line-sequential manner to the plurality of the scanning lines 14 with predetermined timing. In addition, the pixel electrodes 3 are each electrically connected to the drain electrode 19 of the TFT element 13, and by placing the TFT elements 13 in an ON-state for a predetermined period of time, image signals are stored, which are supplied from the data lines 16, with predetermined timing. An image signal having a certain level stored in the pixel electrode 3 is maintained with the common electrode 4 for a predetermined period of time. The electrophoretic particles 5 having charges are attracted to one of the pixel electrode 3 and the common electrode 4, whichever has a polarity opposite to that of the particles, and hence grayshade display can be performed by the contrast between the charged particle color and the dispersion medium color.

As shown in FIG. 4, on the first substrate 1, a plurality of the pixel electrodes 3 are provided, and the data lines 16 and the scanning lines 14 are provided along the longitudinal and lateral boundaries of pixel electrodes 3, respectively. In this embodiment, dot areas formed in regions surrounded by the data lines 16 and the scanning lines 14 are display units, and the structure is formed so that display can be performed by moving the electrophoretic particles 5 in the microcapsules 40 of each dot area arranged in a matrix.

In addition, as shown in FIG. 5, in the electrophoretic layer 21 of this embodiment, the microcapsule wall films 40a of a plurality of neighboring microcapsules 40 are colored in hues 30 to 32. Areas of the hues 30 to 32 each correspond to the dot areas shown in FIG. 4 surrounded by the data lines 16 and the scanning lines 14, and the wall film 40a of the microcapsule 40, disposed in two neighboring dot areas, is colored in two colors as shown in FIG. 5. As described above, according to the structure of this embodiment, since the microcapsule wall films 40a are directly colored, regardless of the arrangement state of the microcapsules 40, hues different from each other can be formed in each dot area.

In this embodiment, the case in which only the microcapsule wall films 40a are colored is described; however, the binder 41 may also be colored together with the microcapsules 40, or the binder 41 only may be colored corresponding to each dot area.

Electronic Apparatus

Next, the structure of an electronic book, which is an embodiment of an electronic apparatus according to the present invention, will be described with reference to FIG. 6.

This electronic book 61 is formed so that data of books of electronic publication, the data being stored in memory media such as CDROM's, is displayed on a display screen for reading, and as the display device therefor, the electrophoretic display device described above is used.

Accordingly, as shown in FIG. 6, the electronic book 61 has a book-shaped frame 62 and a cover 63 capable of opening and closing provided on this frame 62. On the frame 62, there are provided an operation portion 65 and a display device 64 having a display surface in an exposed state.

Inside the frame 62, as shown in FIG. 7, there are provided a controller 36, a counter 37, a memory 38, a data reader (not shown in the figure) for reading data in a memory medium such as CDROM, and the like.

The display device 64 in this embodiment comprises a pixel portion 69 having the structure of the electrophoretic display device 20 as shown in FIG. 1, and peripheral circuits 70 which are provided together with the pixel portion 69 and which are integrated. In the peripheral circuits 70, a decoder type scan driver and a data driver are provided.

As long as being provided with the display device 64 having the structure of the electrophoretic display device, the electrophoretic apparatus of the present invention is not limited to the electronic book described in the above embodiment. Hereinafter, some of other examples of the electronic apparatuses provided with this display device 64 will be described.

Mobile Computer

An example in which the display device 64 described above is applied to a display portion of a mobile computer will first be described. FIG. 8 is a perspective view showing the structure of this personal computer. As shown in FIG. 8, a personal computer 80 is formed of a main body 82 including a keyboard 81 and a display unit including the display device 64 described above.

Mobile Phone

Next, an example in which the display device 64 described above is applied to a display portion of a mobile phone will be described. FIG. 9 is a perspective view showing the structure of this mobile phone. As shown in FIG. 9, in addition to a plurality of operation buttons 91, this mobile phone 90 includes the display device 64 described above together with an earpiece 92 and mouthpiece 93.

Digital Still Camera

Furthermore, an example in which the display device 64 described above is used as a viewfinder for a digital still camera will be described. FIG. 10 is a perspective view showing the structure of this digital still camera, and in addition, connections with external apparatuses are also shown briefly.

Although general cameras expose films by light images of objects, a digital still camera 100 generates an image signal by photoelectric conversion of a light image of an object using an imaging device such as a CCD (Charged Coupled Device).

On the rear surface of a case 101 of the digital still camera 100, the display device 64 described above is provided, and display is performed in accordance with image signals supplied by the CCD. Accordingly, the display device 64 serves as a viewfinder for displaying an object. In addition, at the observation side (rear surface side in the figure) of the case 101, a light-receiving unit 102 including optical lenses, the CCD, and the like is provided.

When a picture taker recognizes an object image displayed in the display device 64 and then presses a shutter button 103, an image signal of the CCD at the same time is transferred to and stored in a memory of a circuit board 104.

In this digital still camera 100, on the side surface of the case 101, a video signal output terminal 105 and a data communication input-output terminal 106 are provided. In addition, as shown in the figure, the former, i.e., the video signal output terminal 105, and the latter, i.e., the data communication input-output terminal 106, are connected to a television monitor 108 and a personal computer 108, respectively, whenever necessary. In addition, in response to predetermined operations, the image signal stored in the memory of the circuit substrate 104 is output to the television monitor 107 or the personal computer 108.

Electronic Paper

Next, an example in which the display device 64 described above is applied to a display portion of electronic paper will be described. FIG. 11 is a perspective view showing the structure of this electronic paper. This electronic paper 110 is formed of a main body 111, which is composed of a rewritable sheet having the texture and flexibility similar to those of paper, and a display unit incorporating the display device 64 described above.

Electronic Notebook

In addition, FIG. 12 is a perspective view showing the structure of an electronic notebook. This electronic notebook 120 comprises a stack of electronic paper 110 and a cover 121 which is folded in half so as to sandwich the stack of electronic paper 110. When the cover 121 is provided with display data input means, the display content can be changed while the electronic paper is in a stacked state.

According to the embodiments of the electronic apparatuses of the present invention, described above, as the display device 64, the electrophoretic display devices of the first to third embodiments are used. Accordingly, although the electrophoretic display device is used, a display device in which parallax is not generated can be obtained.

As the electronic apparatuses described above, in addition to the electronic book in FIG. 6, the personal computer in FIG. 8, the mobile phone in FIG. 9, the digital still camera in FIG. 10, and the electronic paper in FIG. 11, there may be mentioned liquid crystal televisions, viewfinder type and direct viewing type video tape recorders, car navigation apparatuses, pagers, electronic pocketbooks, electronic calculators, word processors, workstations, television phones, POS terminals, apparatuses provided with touché panels, and the like. In addition, to the display portions of the electronic apparatuses mentioned above, the above display device may be naturally applied.

Advantages

As described above, the electrophoretic device of the present invention comprises a first substrate; a first electrode provided on the first substrate; a second substrate; a second electrode which is provided on the second substrate and which opposes the first electrode; and an electrooptic layer provided between the first substrate and the second substrate. In this electrophoretic device described above, the microcapsules, which enclose the electrophoretic dispersion containing the liquid-phase dispersion medium and the electrophoretic particles, are accommodated in the electrophoretic layer, and the wall films of the microcapsules at the viewing side are colored. According to the structure described above, since it becomes not necessary to use color filters, increase in cost can be prevented, and in addition, since the wall films of the microcapsules, which are in contact with the electrophoretic dispersion, at the viewing side are colored, the generation of parallax can be avoided.

In addition, in the method of the present invention for manufacturing the electrophoretic device, as means for performing coloration of the microcapsule wall films and the binder, a printing technique such as an ink-jet method, a screen printing method, or an offset printing method can be used. Accordingly, advantages that electrophoretic devices are manufactured by a simple process can be obtained.

In addition, in the electronic apparatus of the present invention, the display device is formed of the electrophoretic display device incorporating the electrophoretic device. Hence, according to the electronic apparatus of the present invention, although the electrophoretic display device is used, a display device which does not generate parallax can be obtained.

What is claimed is:

1. An electrophoretic device comprising:
    a first substrate;
    a first electrode provided on the first substrate;
    a second substrate;
    a second electrode provided on the second substrate opposing the first electrode; and
    an electrooptic layer provided between the first electrode and the second electrode;
    wherein microcapsules enclosing an electrophoretic dispersion, which contains a liquid-phase dispersion medium and electrophoretic particles, are accommodated in the electrooptic layer, and wall films of the microcapsules at a viewing side are colored.

2. An electrophoretic device according to claim 1, wherein the microcapsule wall films are colored in at least two types of colors.

3. An electrophoretic device according to claim 1, further comprising:

a plurality of dot areas on a surface of the substrate, wherein the electrooptic layer has a plurality of hues, and at least one of said plurality of hues corresponds to each of the dot areas.

4. An electrophoretic device according to claim 1, wherein the electrooptic layer has a plurality of hues, and said plurality of hues correspond to three primary colors of additive mixing or subtractive mixing.

5. An electrophoretic device comprising:

a first substrate;

a first electrode provided on the first substrate;

a second substrate;

a second electrode provided on the second substrate opposing the first electrode; and an electrooptic layer provided between the first electrode and the second electrode;

wherein a binder and microcapsules enclosing an electrophoretic dispersion, which contains a liquid-phase dispersion medium and electrophoretic particles, are accommodated in the electrooptic layer, and the binder at a viewing side is colored.

6. An electrophoretic device according to claim 5, wherein the microcapsule wall films are colored in at least two types of colors.

7. An electrophoretic device according to claim 5, wherein the binder is colored in at least two types of colors.

8. An electrophoretic device according to claim 5, further comprising:

a plurality of dot areas on a surface of the substrate, wherein the electrooptic layer has a plurality of hues, and at least one of said plurality of hues corresponds to each of the dot areas.

9. An electrophoretic device according to claim 5, wherein the electrooptic layer has a plurality of hues, and said plurality of hues correspond to three primary colors of additive mixing or subtractive mixing.

10. An electrophoretic device according to claim 5, wherein the microcapsule wall films and the binder are colored in different colors from each other.

11. An electrophoretic device comprising:

a first substrate;

a first electrode provided on the first substrate;

a second substrate;

a second electrode provided on the second substrate opposing the first electrode; and an electrooptic layer provided between the first electrode and the second electrode;

wherein a binder and microcapsules enclosing an electrophoretic dispersion, which contains a liquid-phase dispersion medium and electrophoretic particles, are accommodated in the electrooptic layer, and at least one of the binder and wall films of the microcapsules at a viewing side is colored.

12. An electrophoretic device according to claim 11, wherein the microcapsule wall films are colored in at least two types of colors.

13. An electrophoretic device according to claim 11, wherein the binder is colored in at least two types of colors.

14. An electrophoretic device according to claim 11, further comprising:

a plurality of dot areas on a surface of the substrate, wherein the electrooptic layer has a plurality of hues, and at least one of said plurality of hues corresponds to each of the dot areas.

15. An electrophoretic device according to claim 11, wherein the electrooptic layer has a plurality of hues, and said plurality of hues correspond to three primary colors of additive mixing or subtractive mixing.

16. An electrophoretic device according to claim 11, wherein the microcapsule wall films and the binder are colored in different colors from each other.

17. A method for manufacturing an electrophoretic device comprising a first substrate, a first electrode provided on the first substrate, a second substrate, a second electrode provided on the second substrate opposing the first electrode, and an electrooptic layer provided between the first electrode and the second electrode, in which microcapsules enclosing an electrophoretic dispersion, which contains a liquid-phase dispersion medium and electrophoretic particles, are accommodated in the electrooptic layer, the method comprising:

a step of coloring wall films of the microcapsules from one surface side of the electrooptic layer in which the microcapsules are accommodated.

18. A method for manufacturing an electrophoretic device, according to claim 17, wherein at least one of the wall films of the microcapsules and the binder is colored by a printing method.

19. A method for manufacturing an electrophoretic device, according to claim 17, further comprising:

a step of moving relative positions of a head for ejecting a coloring material and the substrate; and a step of ejecting the coloring material from the head to one surface side of the electrooptic layer.

20. A method for manufacturing an electrophoretic device comprising a first substrate, a first electrode provided on the first substrate, a second substrate, a second electrode provided on the second substrate opposing the first electrode, and an electrooptic layer provided between the first electrode and the second electrode, in which a binder and microcapsules enclosing an electrophoretic dispersion, which contains a liquid-phase dispersion medium and electrophoretic particles, are accommodated in the electrooptic layer, the method comprising:

a step of coloring at least one of wall films of the microcapsules and the binder from one surface side of the electrooptic layer in which the microcapsules and the binder are accommodated.

21. A method for manufacturing an electrophoretic device, according to claim 20, wherein at least one of the wall films of the microcapsules and the binder is colored by a printing method.

22. A method for manufacturing an electrophoretic device, according to claim 20, further comprising:

a step of moving relative positions of a head for ejecting a coloring material and the substrate; and a step of ejecting the coloring material from the head to one surface side of the electrooptic layer.

* * * * *